Jan. 4, 1966  N. D. LEIGHTON ET AL  3,227,276
AIR SUCTION POTATO CONVEYOR HARVESTING MACHINE
Filed June 19, 1962  3 Sheets-Sheet 1
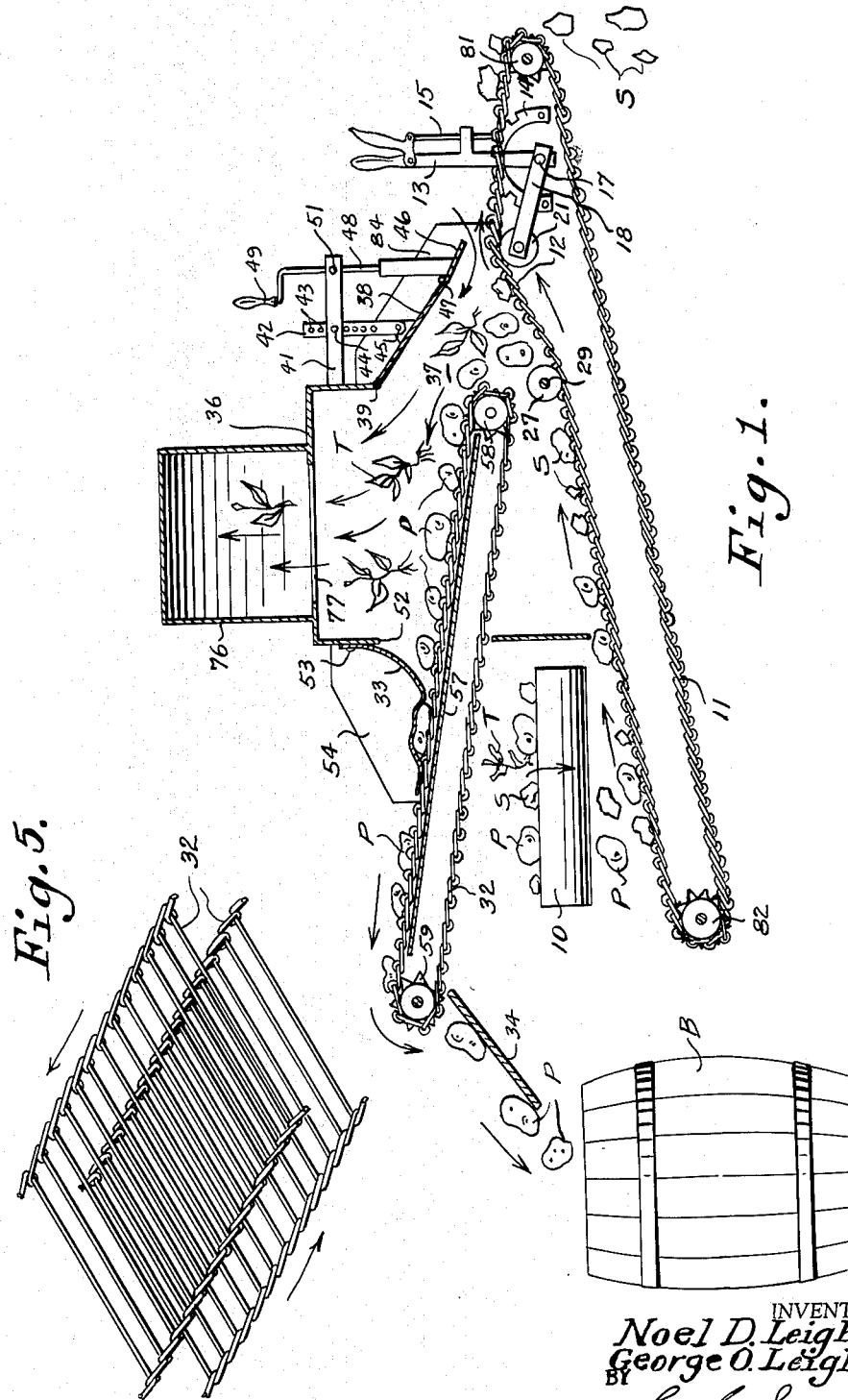
INVENTORS
Noel D. Leighton &
George O. Leighton
BY
L. S. Saulsbury
ATTORNEY

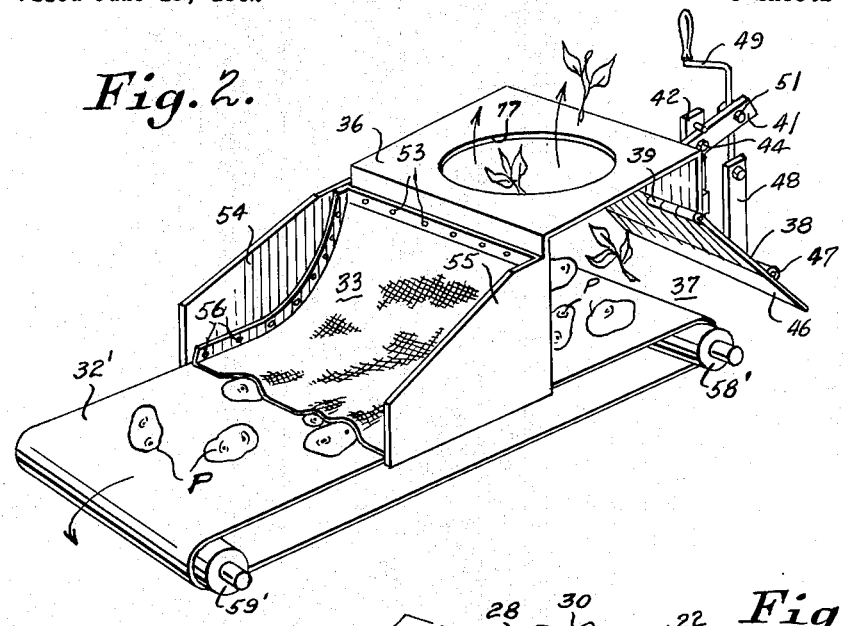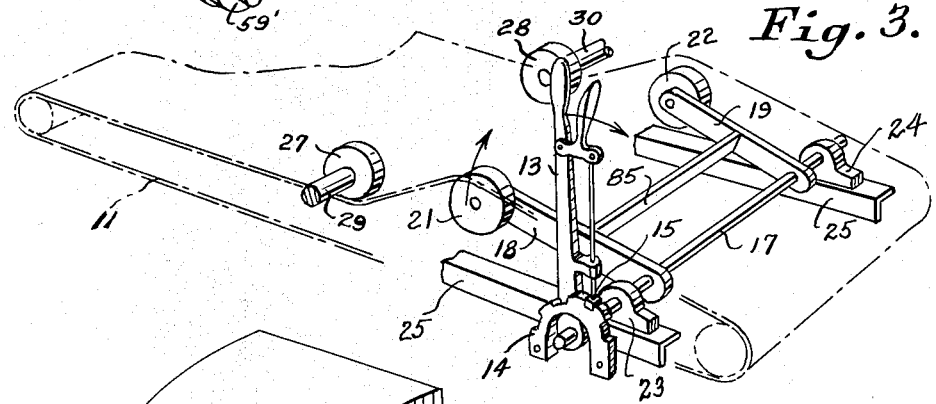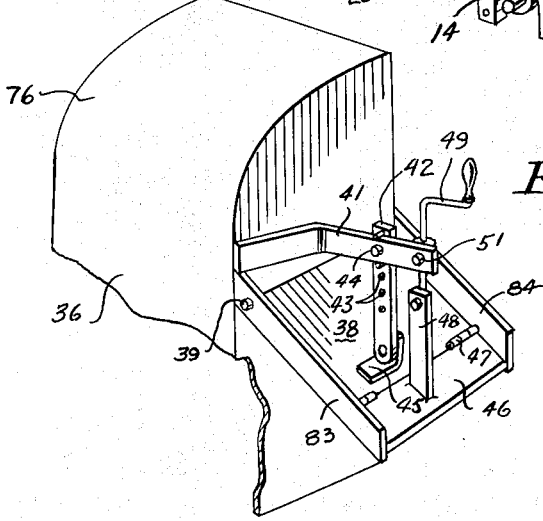

Jan. 4, 1966  N. D. LEIGHTON ET AL  3,227,276
AIR SUCTION POTATO CONVEYOR HARVESTING MACHINE
Filed June 19, 1962  3 Sheets-Sheet 3
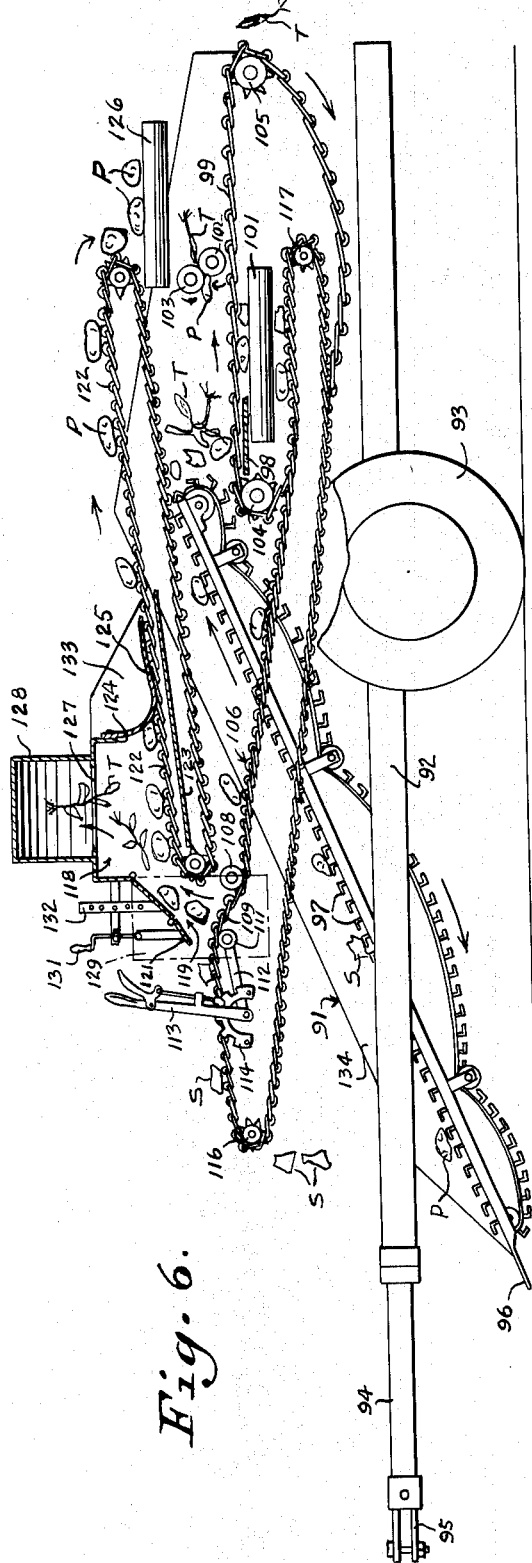
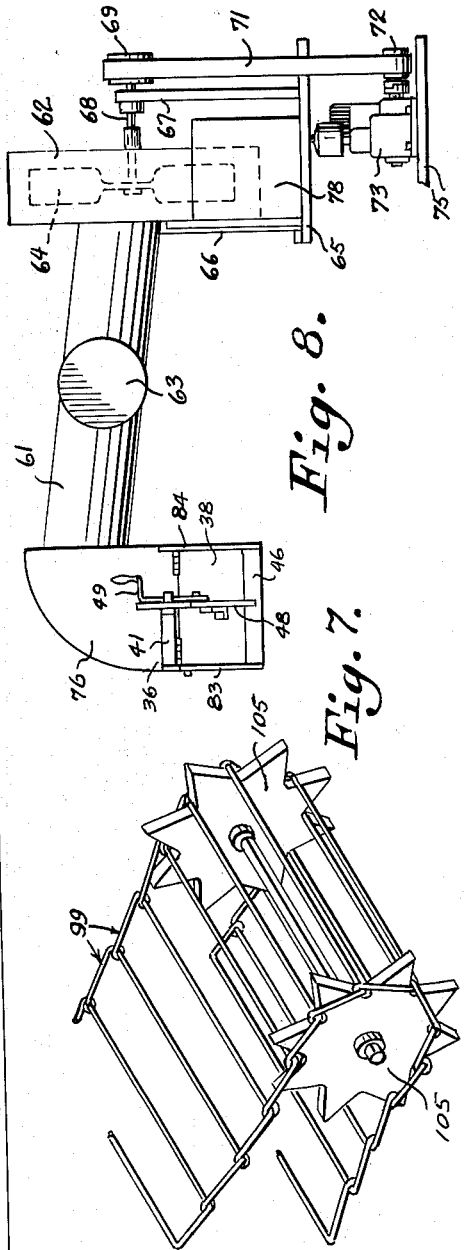
INVENTORS
Noel D. Leighton &
George O. Leighton
BY
L. L. Saulsbury
ATTORNEY

United States Patent Office 3,227,276
Patented Jan. 4, 1966

3,227,276
AIR SUCTION POTATO CONVEYOR
HARVESTING MACHINE
Noel D. Leighton and George O. Leighton, both %
Limestone Machine Co., Inc., Limestone, Maine
Filed June 19, 1962, Ser. No. 203,497
2 Claims. (Cl. 209—139)

This invention relates to an air suction potato harvesting machine serving to separate the potatoes from stones and vines.

It is the principal object of the present invention to provide in a potato harvesting machine an effective air suction chamber separating unit for the removal of potatoes from a conveyor bearing potatoes, stones and vines and release of the potatoes within the air suction chamber for deposit upon a potato outlet conveyor separate from the stones and vines ready for bagging on the machine or for delivery to a traveling side truck.

It is another object of the invention to provide in an air suction potato separating unit for potato harvesting machines adjustable means to permit the positioning of the potatoes relative to the suction potato inlet opening of the air suction expansion chamber so that at the moment of their travel under the potato inlet opening that they will be inclined toward the opening to make the suction upon the potatoes more effective.

It is still another object of the invention to provide an air suction expansible chamber for a potato harvesting machine in which the potato and air suction inlet opening may be adjustably controlled to regulate the suction and to bring the inlet opening into close proximity to the potatoes traversing the conveyor beneath the potato inlet opening and in which such adjustment is in the form of an articulate flap hinged to the expansion chamber across the top of the inlet opening and depending downwardly and outwardly over the conveyor.

It is a further object of the invention to provide a potato harvester utilizing air suction to remove the potatoes from a conveyor containing as well the stones and vines with effective means for sealing the potato outlet opening of the air suction chamber while permitting the potatoes leaving the expansion chamber on a discharge conveyor to be sealed thereagainst under the action of this suction effected within the chamber and thereby limiting the admission of the suction air to the potato inlet opening.

Other objects of the invention are to provide an air suction separator for potato harvesting machines, having the above objects in mind, which is of simple construction, easy to maintain in operation, compact, has a minimum of opportunity for the collection of trash tending to clog the machine, has a minimum number of parts, has a single suction air stream for effecting the separation of the potatoes from the stones and the vines from the potatoes, in which injury to the potatoes is kept to a minimum and that is compact, efficient and effective in operation.

For a better understanding of the invention, reference may be had to the following detailed description taken in connection with the accompanying drawing, in which FIGURE 1 is a more or less diagrammatic longitudinal sectional view of the air suction potato separator adapted for use with a single row digging apparatus, FIG. 2 is a front perspective view of the air suction expansion chamber with the side of the same opened to show the interior thereof and looking upon the adjustable flap that controls the potato inlet opening and upon the outlet conveyor and air seal means at the potato outlet opening showing a modified form of discharge conveyor, FIG. 3 is a fragment and illustrative view of the quadrant lever adjustment mechanism for varying the pitch and incline of the potato, stone and vine delivery conveyor at the potato inlet opening, FIG. 4 is a fragmentary perspective view of the air suction expansion chamber looking downwardly upon the flap adjusting means for controlling the air suction being drawn through the potato inlet opening, FIG. 5 is a fragmentary perspective view of two runs of the narrowly spaced rod conveyors, FIG. 6 is a longitudinal sectional view of a modified form of the invention in which the suction unit is adapted for a two row potato picking operation, FIG. 7 is a fragmentary perspective view of a widely spaced rod chamber conveyor used for the initial separation of potatoes, stones and vines, in the two row form of the invention shown in FIG. 6, FIG. 8 is a vertical elevational view of the expansion chamber and the suction fan operating unit connected therewith through a suction pipe that has a clean out thimble opening for the removal of vines that may have collected in the pipe.

Referring now particularly to FIGS. 1 to 5, stones and trash that may remain from the single digger, not shown, are delivered on a belt cross conveyor 10 from the potato digger, the potatoes being identified at P while the stones and trash are identified respectively at S and T. From this cross conveyor 10, the potatoes, stones and trash are delivered to a steel lag chain conveyor 11 running longitudinally of the machine that is inclined from front to rear and powered in a manner to be later described and delivers the potatoes and stones in the direction indicated by the arrow toward the rear of the machine, and upwardly over an adjustable peak or incline 12 effected on the chain conveyor 11 and made adjustable up or down by a hand lever 13 operable over a quadrant 14 and having a hand latch detent device 15 for locking engagement therewith, FIG. 3. The lag chain conveyor 11 may be adjusted up or down to vary the pitch or inclination for best potato and stone separation. The hand lever 13 is secured to a cross shaft 17 that rigidly carries lateral-spaced forwardly-extending lift arms 18 and 19 on the outer ends of which are respective idler lift rollers 21 and 22 that engage the opposite side edges of the upper passage of the conveyor to adjust the conveyor up and down to form the peak or inclination 12. The shaft 17 is journalled at its opposite ends in bearing blocks 23 and 24 carried respectively on a machine frame 25. These stones continue on the conveyor 11 past the incline 12 and drop off the rear end of the conveyor onto the ground behind the machine, or may be conveyed to a collecting truck body or cart and hauled off the potato field.

Hold down rollers 27 and 28 operate on the sides of the upper run of the conveyor 11 and are journalled respectively from shafts 29 and 30 on the machine frame which hold down the conveyor 11 so that a more effective adjustment of the peak or incline 12 of the conveyor can be effected with the adjustable lift rollers 21 and 22.

Extending longitudinally above the delivery conveyor 11 and inclined in an opposite direction and from the rear upwardly toward the front is a potato discharge conveyor 32 of the lag chain type, FIG. 1, or which may be of the belt type as shown in FIG. 2, for conveying the potatoes after having been separated from the stones and trash from under a flexible air seal 33 onto a chute 34 located at the forward end of the conveyor and into a barrel B traveling with the machine. These potatoes can also be delivered from the discharge conveyor to a boom conveyor running to a hopper body on a truck or drawn by a tractor.

An air suction expansion chamber 36 sucks or draws the potatoes from the delivery conveyor 11 at the peak or incline 12 thereof and onto the discharge conveyor 32 by suction air effected in the expansion chamber 36, any trash T remaining on the conveyor being lifted from the expansion chamber 36 upon the potatoes P being released from the air stream and onto the discharge conveyor 32 and outwardly under the flexible air seal 33 toward the barrel B.

At the entrance of the potatoes to the air suction expansion chamber 36 is a restricted air zone 37 overlying the peak or incline 12 of the chain conveyor 11 which can be varied in area by an adjustable inclined flap 38 hinged at 39 upon the rear of the expansion chamber 36. This restricted area gives the air the velocity needed to pick the potatoes from the chain conveyor 11.

The flap 38 is supported in its adjusted position from a bracket arm 41 extending rearwardly from the chamber and a pivot link 42 having a series of bolt holes 43 therein from any one of which the arm is connected by a bolt 44 to the bracket arm 41, the pivot link being pivotally connected to a boss 45 on the top of the flap, and by this adjustment the restricted air zone 37 is primarily controlled. Upon flap 38 being lowered the restricted air zone 37 for the air is reduced and if the flap 38 is elevated the restricted area zone is increased. This adjustment of the flap 38 taken with the adjustment of the conveyor lift rollers 21 and 22 control the air suction power and lifting of the potatoes to separate them from the stone S and the potato conveyor 11.

Further adjustment for the air being drawn into the expansion chamber is effected by an auxiliary flap 46 hinged at 47 to the rear end of the main flap 38 and adjusted by a crank-operated extensible link device 48 having a hand crank handle 49 and pivotally connected to the rear end of the flap supporting bracket arm 41 as indicated at 51. The expansion chamber 36 has a front discharge opening 52 through which the potato discharge conveyor 32 is extended and from which the flexible air seal 33 extends forwardly. The potatoes P are thus discharged forwardly through this opening 52 of the expansion chamber 36. The air seal 33 is made of canvas, wool cloth or any other dense flexible material and is fastened to the expansion chamber at the top of the opening by fasteners 53 and extends loosely forwardly for a distance over the chain conveyor 32 between spaced side walls 54 and 55 lying at the opposite sides of the conveyor 32 and extending forwardly from the sides of the opening 52. Fasteners 56 further connect the flexible fabric seal 33 to the side walls 54 and 55, FIG. 2.

The air suction from the expansion chamber 36 holds the flexible air seal 33 tight upon the lag chain conveyor 32 and steel plate 57 or closed belt 32' thereby stopping any air leak into the expansion chamber 36 but at the same time allowing potatoes to be discharged from under the air seal. The flexible material of the air seal 33 is such as to allow the same to conform to the shape of the potatoes so that little leakage will take place upon the discharge of the potatoes by the lag chain or the belt. The steel plate 57 is located under the upper run of the lag chain conveyor 32 and extending from an inner lag chain idler roller 58 outwardly through the chamber discharge opening 52 to beyond the flexible air seal 33 and to an outer lag chain drive roller 59 to stop any air leak through the steel rod lag chain into the expansion chamber 36. This plate is unnecessary where the conveyor is a solid belt 32' as shown in FIG. 2 that is stretched between rollers 58' and 59'.

The idler lag chain or belt rollers 58 and 58' lie wholly within the expansion chamber 36 and are journalled between the sides thereof. While these rollers 58 and 58' are idlers, their respective opposite rollers 59 and 59' are drive rollers and are disposed at the discharge end of the conveyor 32 or 32'. The rollers 59 and 59' respectively drive these conveyors 32 and 32' in the direction indicated by the arrows and discharge the potatoes upon the chute 34 and into the barrel B.

The expansion chamber 36 further has a large pipe outlet conduit 61, FIG. 8, that is connected with a suction fan 62. The pipe outlet conduit 61 has a clean out thimble 63 that can be removed to take out any of the trash T that may have been accumulated in the pipe conduit 61 and to free the conduit for air travel. The suction fan 62 has multiple fan blades 64 and is supported upon a platform 65 by vertical supports 66 and 67 in the latter of which a fan blade drive shaft 68 is journalled. The drive shaft 68 has a pulley 69 that is driven by belt 71 and drive pulley 72 of a gasoline engine 73 supported on a platform on a part of the machine frame as indicated at 75.

The pipe conduit 61 extends from a large elbow fitting 76 that rests on the top of the expansion chamber 36 and over a large round top opening 77. The separation of the potatoes P from the stones is generally effected at an area indicated at 37 underlying the inclined flap 38 when the potatoes are lifted by air suction from the peak or inclined portion 12 of the lag chain conveyor 11 and auxiliary flap 46. The trash T remaining on the conveyor 11 is taken off the conveyor with the potatoes P and into the expansion chamber 36 and is separated from the potatoes by air stream and taken through the top opening 17 of the expansion chamber, pipe conduit 61 and exhausted by the suction fan 62 into a trash container 78 on the fan platform 65. Trash collected in the pipe conduit 61 can be taken therefrom by removing the clean out thimble 63.

The conveyor 11 has drive sprocket 81 at the rear of the machine and an idler sprocket 82 at the front of the machine. The drive sprocket 59 and roller 59' are driven by suitable power mechanism provided upon the machine frame.

The inclined flap 38 is disposed between the vertical side plates 83 extending rearwardly from the opposite sides of the expansion chamber 36 along the conveyor 11 and downwardly below the peak portion 12 thereof. The rollers 21 and 22 that control the height of the peak portion 12 extend from the arms 18 and 19 as best shown in FIG. 3, wherein these arms 18 and 19 are rigidly connected to the cross shaft 17 and to one another by a cross member 85, FIG. 3. The shaft 17 is journalled in the bearings 23, and 24 carried on frame members 25 and the quadrant lever 13, its quadrant 14 lie outwardly of the bearing 23, the quadrant being anchored to some other part of the frame, not shown. The side plates 83 and 84 and the flaps 38 and 46 project rearwardly to provide a nose-like projection at the rear of the expansion chamber extending over the incline or peak portion 12 of the conveyor 11 and the picking area 37.

While in the illustrations shown, the potato discharge conveyor 32 runs parallel to the potato delivery conveyor 11, it should be apparent that the conveyor 32 can be arranged at right angles and extend out of the expansion chamber 18 from any of the sides thereof except the side with the inclined flap 38, and the potatoes drawn over the side of the conveyor 32 for deposit thereon. The arrangement of these conveyors 11 and 32 can thus depend on the design of the complete potato harvester. Referring now particularly to FIGS. 6 and 7, there is shown a modified form of the potato harvester that includes two potato diggers 91, only one being shown, and an expansion chamber that is located forwardly on the harvesting machine frame 92. This frame 92 is supported by wheels 93 and is drawn by a pole 94 that has hitch 95 adapted to be connected to a tractor draw bar. The two potato diggers are connected to one side of the harvester frame 92 and has a spade or shovel 96 to lift the potatoes, stone and vines from the potatoes of the rows in the field. The connection of the diggers 91 with the machine frame 92 is such as to permit their spades 92 to be raised and lowered and accommodate themselves to the potato row.

The diggers 91 have steel rod lag chain conveyors 97 that elevate the potatoes, stones and vines as they are taken from the ground. The large potatoes, stones and vines are received upon short steel plate 98 located directly under wide spread steel rod lag chain conveyors 99, FIG. 7, and running rearwardly for a short distance thereunder and are pulled by the chain conveyors 99 over the length thereof and dropped therethrough onto a cross belt conveyor 101. The steel rods of the lag chain conveyors 99 are widely spaced so as to allow the potatoes and stones to fall easily therethrough, but the trash or tops being long will ride rearwardly on the conveyors 99 into de-vining rollers 102 and 103 turning respectively in opposite directions, the lower roller 102 turning clockwise and the upper roller 103 turning counterclockwise. The potatoes are pulled from the vines and the vines drawn between the rollers and taken by the conveyor 99 to the rear of the harvester and deposited on the ground therefrom while the de-vined potatoes drop through the conveyor lags into the cross belt conveyor 101. Potatoes still clinging to the vines when the vines go through the rollers 102 and 103 are pulled up against the rollers and broken loose from the vines thereby. The cross conveyor 101 thus receives the large potatoes and large stones that pass through it, the small stones will have been disposed of as the potatoes and stones are elevated by narrow speed chain conveyors 97 of the diggers 91.

The wider spread steel rod lag chain conveyors 99 are located at the side of the machine respectively in line with the respective diggers 91 and are run over sprockets 104 and 105 the sprocket 105 being driven by drive power mechanism usually provided on harvester machines. The cross belt conveyor 101 is driven between two rollers that will be similarly driven by the same power mechanism.

The cross belt conveyor 101 delivers the potatoes and stones to a longitudinally-extending lag chain conveyor 106 that carries them forward instead of rearwardly as in the form of the invention above described, but the steel rods of the conveyor 106 are narrowly spaced to carry the potatoes and stones. The upper run of the conveyor is held down forwardly by opposing side rollers 108 and extended upwardly therefrom is an inclined portion 109 which is held up by rollers 111 on lever arms 112 that can be adjusted by a quadrant detent lever 113 worked upon a quadrant 114 in the manner above described. This forwardly running conveyor 106 extends between two sprockets 116 and 117, the forward one of which will be driven. The potatoes are removed from the conveyor at the inclined portion 109 by air suction while the stones continue to travel on to be discharged over the forward end of the conveyor 106.

Air suction from an expansion chamber 118 lifts the potatoes P through a constricted air zone 119 immediately from the inclined conveyor portion 109 and under adjustable air control flap 121, when in the expansion chamber the potatoes are released and deposited upon a discharge conveyor 122 running rearwardly and above the delivery conveyor 106. This discharge conveyor 122 is formed of steel rod lag chain but may be of solid belt, such as shown in FIG. 2 and runs rearwardly over a steel plate 123 taking with it the potatoes P that have been picked from the delivery conveyor 106. The potatoes P are taken through air sealed opening 124 under a flexible air seal material 125 and are deposited on a final discharge cross belt conveyor 126 from which they are delivered to a barrel or conveyed to a nearby hopper body of a truck traveling beside the potato harvester. Trash T is sucked upwardly through an opening 127 in the top of the expansion chamber 118 and through an elbow fitting 128 and pipe conduit and suction fan system the same as shown in FIG. 8 and described herein above.

The adjustable flap 121 controls the amount of air that is sucked into the expansion chamber 118 for the purpose of lifting the potatoes and for the best and most effective separation from the stones. It is adjustable between the forwardly extending side plates 129 and main and auxiliary adjusting devices 131 and 132 and the operation is the same as above described. Side plates 133 extend along the sides of the flexible air seal 125 to render the air seal more effective. The diggers 91 have side boards 134.

While driving mechanism has not been shown for the operation of the several conveyors, it shall be understood that more or less standard equipment and mechanism are used and that the drive can be effected either from a drive taken from a tractor or from a power plant provided upon the potato harvester.

It should now be apparent that there has been provided a suction-operated potato separating machine for removing the potatoes from the rock and trash by use of air suction as effected by a large power-operated suction fan serving as part of the equipment. It should also be apparent that adequate provision has been made to control the pitch or incline of movement of the potatoes and the air suction opening area as well as the outlet area for the discharge of the potatoes from the expansion chamber so that maximum efficiency of the separating chamber will be obtained.

While various changes may be made in the detailed construction, it shall be understood that such changes shall be within the spirit and scope of the present invention as defined by the appended claims.

What is claimed is:

1. An air suction potato harvesting machine for separating potatoes from stones and vines comprising an air suction expansion chamber having potato inlet and discharge openings, a potato and stone delivery conveyor extending into proximity of the potato inlet opening and into the path of suction air being drawn into the expansion chamber so that the potatoes are lifted from the conveyor while the stones are permitted to continue to travel on the conveyor and be discharged therefrom, a potato discharge conveyor extending into the potato outlet opening of the expansion chamber and into proximity of the potato inlet opening so as to receive the potatoes being drawn from the delivery conveyor through the inlet opening and into the expansion chamber, adjustable flap means for controlling the flow of air being sucked through the potato inlet opening, means for sealing expansion chamber about the discharge outlet opening and potato discharge conveyor while permitting the passage of the potatoes through the potato discharge opening thereof, means for adjusting the pitch of a portion of the delivery conveyor to provide elevated travel of the potatoes at the point of release of the potatoes from the delivery conveyor and in the proximity of the potato inlet opening of the expansion chamber, the means for controlling the flow of suction air entering the potato inlet opening comprising an adjustable flap hingedly connected to the expansion chamber across the top of the potato inlet opening and depending outwardly and downwardly therefrom, means for retaining said flap in any one of its adjusted positions relative to the inclined portion of the delivery conveyor and the inlet opening of the expansion chamber, and an auxiliary flap hinged to the lower end of the said adjustable flap and hand crank means extending between the auxiliary flap and the said first-mentioned adjustable flap means to alter the position of the auxiliary flap relative to the first-mentioned adjustable flap.

2. An air suction potato harvesting machine for separating potatoes from stones and vines comprising an air suction expansion chamber having potato inlet and discharge openings, a potato and stone delivery conveyor extending into proximity of the potato inlet opening and into the path of suction air being drawn into the expansion chamber so that the potatoes are lifted from the conveyor while the stones are permitted to continue to travel on the conveyor and be discharged therefrom, a potato discharge conveyor extending into the potato outlet opening of the expansion chamber and into proximity of the potato inlet opening so as to receive the potatoes being drawn from the delivery conveyor through the inlet opening and into the expansion chamber, adjustable flap means for controlling the flow of air being sucked through the potato inlet opening, means for sealing the expansion chamber about the discharge outlet opening and potato discharge conveyor while permitting the passage of the potatoes through the potato discharge opening thereof, the means for controlling the flow of suction air entering the potato inlet opening comprising an adjustable flap hingedly connected to the expansion chamber across the top of the potato inlet opening and depending outwardly and downwardly therefrom, means for retaining said flap in any one of its adjusted positions relative to the inclined portion of the delivery conveyor and the inlet opening of the expansion chamber, and an auxiliary flap hinged to the lower end of the said adjustable flap and hand crank means extending between the auxiliary flap and the said first-mentioned adjustable flap means to alter the position of the auxiliary flap relative to the first-mentioned adjustable flap.

References Cited by the Examiner

UNITED STATES PATENTS

| | | | |
|---|---|---|---|
| 2,653,712 | 9/1953 | Leighton | 209—139 |
| 2,657,798 | 11/1953 | Young | 209—138 |
| 2,717,076 | 9/1955 | Leighton | 209—138 |
| 2,717,077 | 9/1955 | Leighton | 209—139 |

HARRY B. THORNTON, *Primary Examiner.*

FRANK W. LUTTER, *Examiner.*